H. BAERBALCK & C. D. GIBSON.
GEARING.
APPLICATION FILED OCT. 1, 1910.
1,003,315.
Patented Sept. 12, 1911.
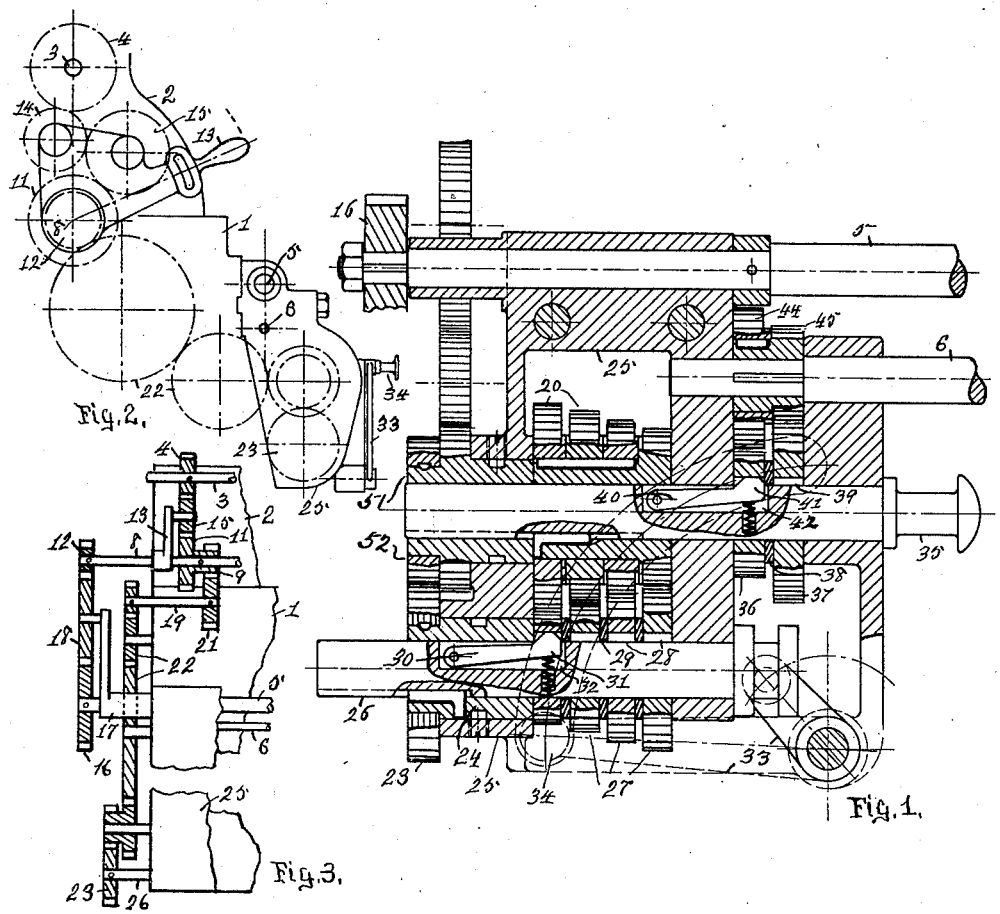
Witnesses,
Samuel Carr.
Stanley L. Bowdle
Hans Baerbalck, Inventors.
and Charles D. Gibson.
By Robert S. Carr, Atty.

UNITED STATES PATENT OFFICE.

HANS BAERBALCK AND CHARLES D. GIBSON, OF HAMILTON, OHIO, ASSIGNORS TO THE HAMILTON MACHINE TOOL COMPANY, OF HAMILTON, OHIO, A CORPORATION OF OHIO.

GEARING.

1,003,315.      Specification of Letters Patent.      Patented Sept. 12, 1911.

Application filed October 1, 1910. Serial No. 584,841.

*To all whom it may concern:*

Be it known that we, HANS BAERBALCK and CHARLES D. GIBSON, the former a citizen of Germany, the latter a citizen of the United States, both residing at Hamilton, Ohio, have invented a new and useful Improvement in Gearing, of which the following is a specification.

Our invention relates to gearing of the class adapted to the use of engine lathes or for other suitable purposes, and the objects of our improvements are to provide means for driving the feed rod at different speeds in relation to the live spindle; to provide a series of speed changing gears in compact form for the feed rod; and to provide simple and durable construction and assemblage of the various members for securing facility of operation and efficiency of action. These objects are attained in the following described manner as illustrated in the accompanying drawings, in which:—

Figure 1 is a sectional view of the speed changing gears for the feed rod embodying our improvements; Figs. 2 and 3 diagrammatic views in end elevation and in longitudinal section respectively of the trains of gears driven by the live spindle.

In the drawings, 1 and 2 represent respectively portions of the bed and of the head stock, 3 the live spindle provided with the spindle gear 4, 5 the lead screw, 6 the feed rod and 7 the carriage of an engine lathe all being constructed and arranged in the ordinary manner.

A shaft 8 is provided with gears 9, 11 and 12 and with a quadrant lever 13 which is provided with idle gears 14 and 15 in continuous engagement with each other. Gear 15 is in continuous engagement with gear 11 on shaft 8 and said quadrant lever serves to move either of the idle gears 14 or 15 into or out of engagement with the spindle gear 4 for reversing the direction of or discontinuing the action of shaft 8. The lead screw is provided with a gear 16 and with a quadrant 17 which carries an idle gear 18 in continuous engagement with said gear 16 and whereby said gear 18 may be detachably engaged with gear 12 on shaft 8 for driving the lead screw. Shaft 19 is provided with a gear 21 in continuous engagement with gear 9 on shaft 8 and a train of gears 22 serves to drive gear 23 from shaft 19. Gear 23 is journaled by means of a driven sleeve 24 in the casing 25 of a speed box which may be removably secured on the lathe bed. A shaft 26 splined within sleeve 24 is provided with a series 27 of idler gears each being formed with a key seat 28 and separated from each other by means of washers 29 on said shaft. A spring actuated latch 30 formed with a tapered nose 31 is pivotally secured within a longitudinal recess 32 formed in shaft 26. An arm 33 pivotally secured at a fixed point and provided with a latch pin 34 serves to move and maintain shaft 26 longitudinally with the latch 31 into engagement with the key seat of either gear of series 27 for causing it to turn with said shaft. A driving sleeve 51 journaled in the casing is provided with a gear 52 in engagement with gear 23. An intermediate shaft 35 is journaled in said sleeve and a series 20 of gears of different size secured together and splined thereon are in continuous engagement with the corresponding gears of series 27 of idle gears on shaft 26. Different sized idle gears 36 and 37 on shaft 35 are separated by a washer 38 thereon and each formed with a key seat 39. A spring actuated latch or key 40 formed with a tapered nose 41 is pivotally secured at one of its ends within a longitudinal recess 42 formed in shaft 35. Said shaft may be pulled longitudinally with the other end of said latch into automatic engagement with the key seat of either of the gears 36 or 37 to cause it to turn with said shaft. The feed rod 6 journaled in the casing of the speed box 25 is provided with gears 44 and 45 in continuous engagement with the corresponding idle gears 36 and 37 on shaft 35.

In operation, the quadrant lever 13 serves to move gears 14 and 15 entirely out of engagement with the live spindle gear or alternately into engagement therewith for turning shaft 8 and the connecting trains of gears with the lead screw and with the feed shaft in either of opposite directions. Quadrant lever 17 serves to move gear 18 into or out of engagement with gear 12 for turning the lead screw or for throwing it out of action as desired independently of the action of the feed rod. A wide change in the speed of the feed rod may be effected by the alternate engagement of latch 40 with the idle gears 36 and 37 and intermediate graduated changes in the speed of said rod may be effected by the successive engagement of latch 30 with the corresponding idle gears of series 27 on shaft 26.

Having fully described our improvements, what we claim as our invention and desire to secure by Letters Patent of the United States is:—

A gearing comprising a casing, a driven shaft journaled therein, gears secured thereon, a driving and a driven sleeve journaled in the casing, intermeshing gears secured on said sleeves, a shaft splined in the driven sleeve, idle gears thereon, a latch movable longitudinally with said shaft for separately engaging the idle gears to turn therewith, an intermediate shaft journaled in the driving sleeve, a series of connected gears splined thereon and respectively engaging with the corresponding idle gears, idle gears on the intermediate shaft engaging with corresponding gears on the driven shaft, and a latch movable longitudinally with the intermediate shaft for separately engaging the idle gears on said intermediate shaft to turn therewith.

HANS BAERBALCK.
CHARLES D. GIBSON.

Witnesses:
BEN A. BICKLEY,
R. S. CARR.

Copies of this patent may be obtained for five cents each, by addressing the "Commissioner of Patents, Washington, D. C."